March 20, 1956  E. E. JONES  2,738,692
MACHINE TOOL
Filed Oct. 12, 1953  5 Sheets-Sheet 1
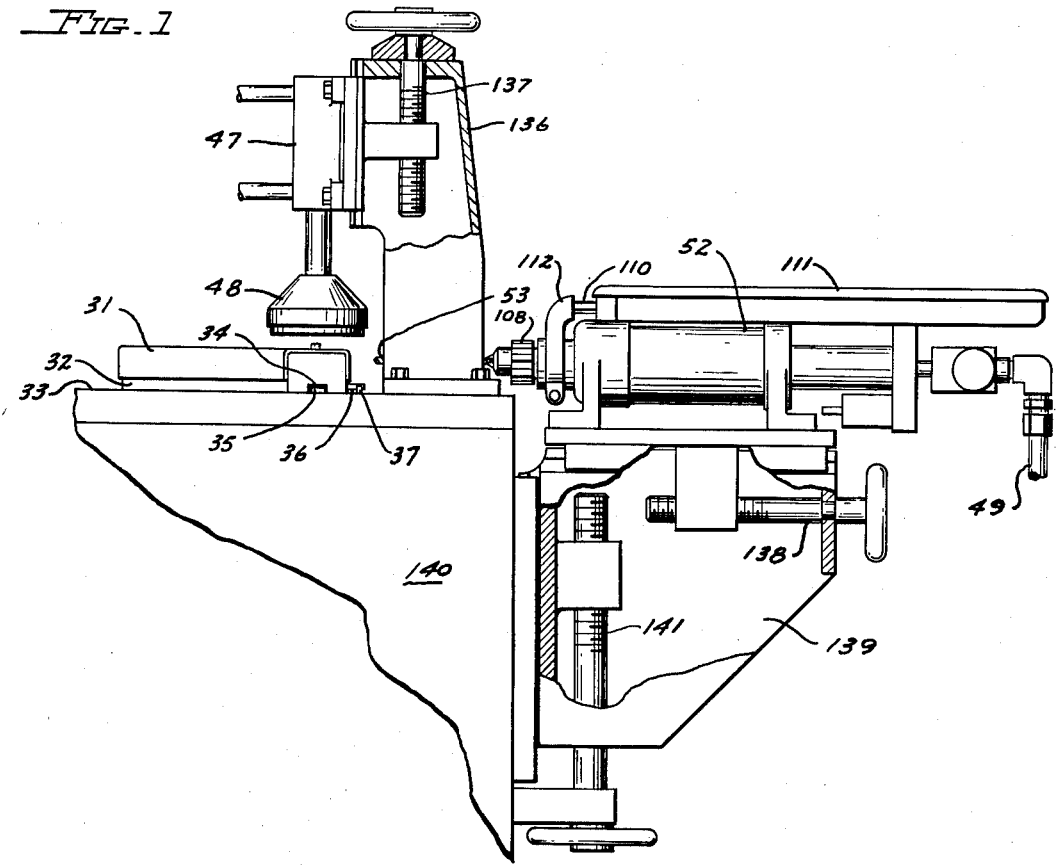
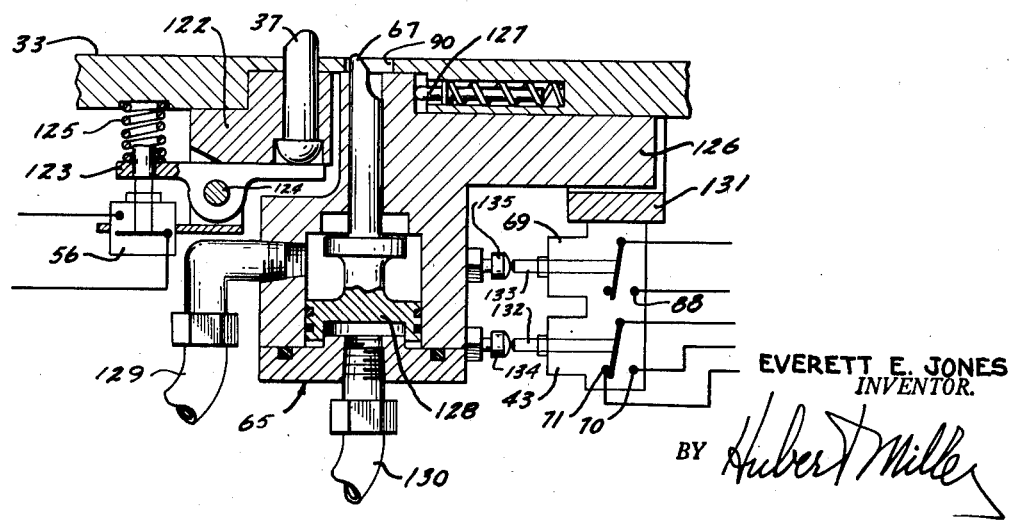
EVERETT E. JONES
INVENTOR.
BY Hubert Miller March 20, 1956  E. E. JONES  2,738,692
MACHINE TOOL Filed Oct. 12, 1953  5 Sheets-Sheet 2

EVERETT E. JONES
INVENTOR.

BY Hubert Miller

March 20, 1956
E. E. JONES
2,738,692
MACHINE TOOL
Filed Oct. 12, 1953
5 Sheets-Sheet 3
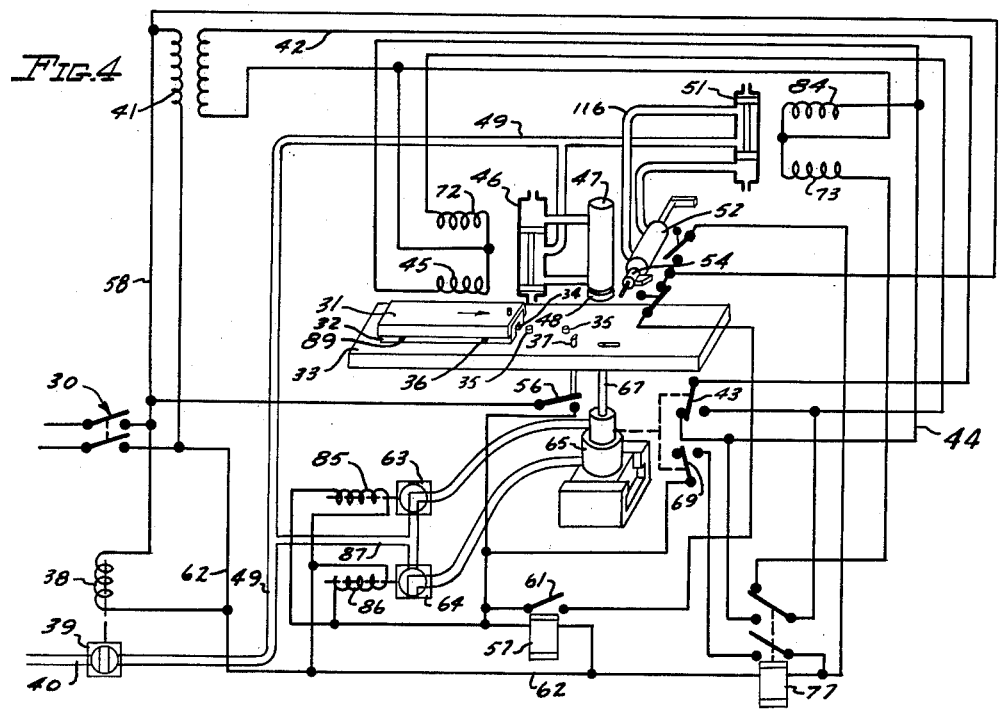
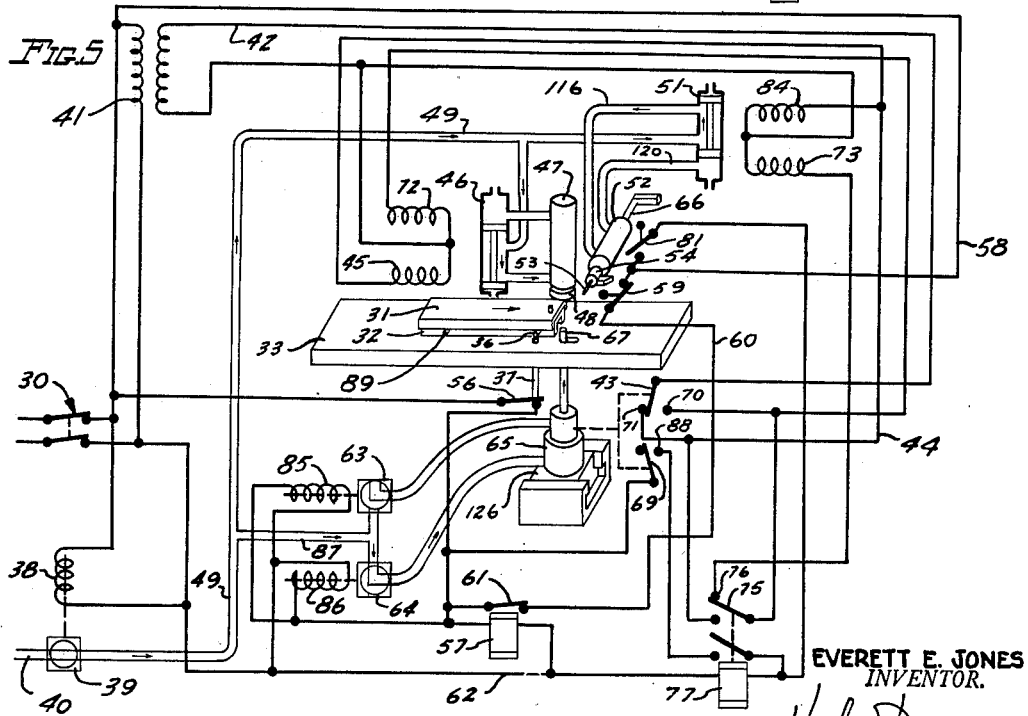
EVERETT E. JONES
INVENTOR.
BY Hubert Miller

EVERETT E. JONES
INVENTOR.

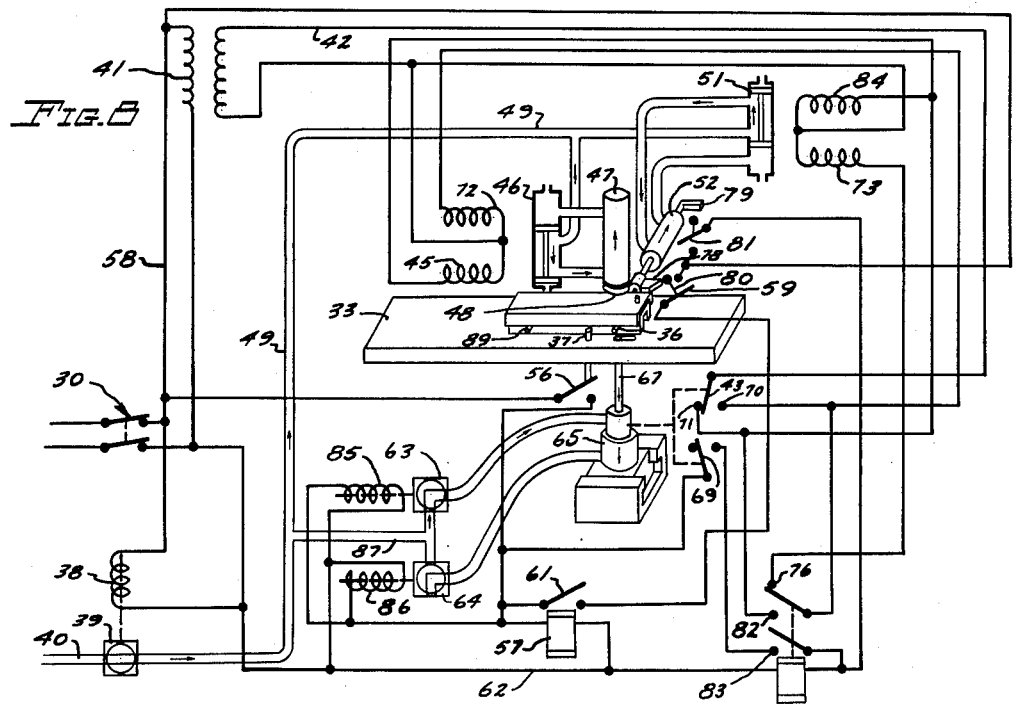

United States Patent Office 2,738,692
Patented Mar. 20, 1956

2,738,692

MACHINE TOOL

Everett E. Jones, Waynesboro, Pa., assignor to Boeing Airplane Company, Wichita, Kans., a corporation of Delaware Application October 12, 1953, Serial No. 385,589

7 Claims. (Cl. 77—32.2)

This invention relates to an improved power operated machine tool for successively performing desired work operations at desired predetermined locations on workpieces of various sizes and shapes.

The forming of sheet metal parts on a hydro-press is a relatively expensive operation. It creates internal stresses in the part being formed. These stresses cause distortion of the part from its formed shape after it is released from the forming pressure. Such distortion causes changes in pre-drilled hole locations, in flange dimensions and angles, etc. Hand re-work of the part is then necessary to form it to the required tolerance. All hand work is costly and time consuming.

Stretch-bend forming of such parts is much less expensive because it leaves no internal stresses in the material being formed, and distortion and the necessity for hand re-work are thus eliminated. Parts which are to be formed by stretch-bending cannot be pre-drilled, however, because the stretching of the material during forming would cause change of hole locations. Consequently some fast means of drilling holes in stretch formed parts, at accurately located points, has long been needed. As a matter of fact, the aircraft industry often forms parts by the more expensive hydro-press method due solely to inability to obtain tools capable of rapidly drilling holes at desired locations in parts formed by other methods, such as stretch-bend forming.

It is the primary object of this invention to provide a tool which can be operated by an unskilled operator, and which will automatically locate the points on a formed part at which holes are to be provided, and which will successively drill or punch the holes at such points, maintaining extremely close tolerance for the hole locations.

It is an additional object to provide a tool of this type which will handle formed parts of various shapes and sizes, and which will index and drill or punch the desired holes at a rate as high as 180 holes per minute.

Another object is to provide a tool of the type mentioned which requires no "set-up" time to handle parts of different shape and size, as opposed to the very extensive "set-up" time required by conventional drilling and hole punching machines for each different part.

Another object is to provide a tool of this type which occupies only approximately one-fourth as much floor space as is required for conventional hole drilling or hole punching machines.

Another important object is the provision of a thoroughly reliable electrical control system for the various fluid pressure actuated operating mechanisms of a hole indexing and drilling or punching machine of the type mentioned.

A further object is to provide a tool of the type mentioned in which the holes are always drilled or punched perpendicular to the workpiece surface being penetrated.

Another object is to provide a tool of this type which successively drills or punches irregularly located holes in a formed part without requiring the depression of a pedal or the movement of any control lever or the like by the operator.

The invention, together with other objects attending its production, will be more clearly understood when the following description is read in connection with the accompanying drawings, in which:

Fig. 1 is a fragmentary side elevation of a hole indexing and drilling machine embodying the invention, with certain parts shown in section for clarity;

Fig. 2 is a vertical sectional view of a part of the control mechanism of the machine, showing details in construction;

Figs. 4 to 8 inclusive are schematic views of the machine and its control system, and illustrate various phases in the cycle of its operation.

Figure 3:
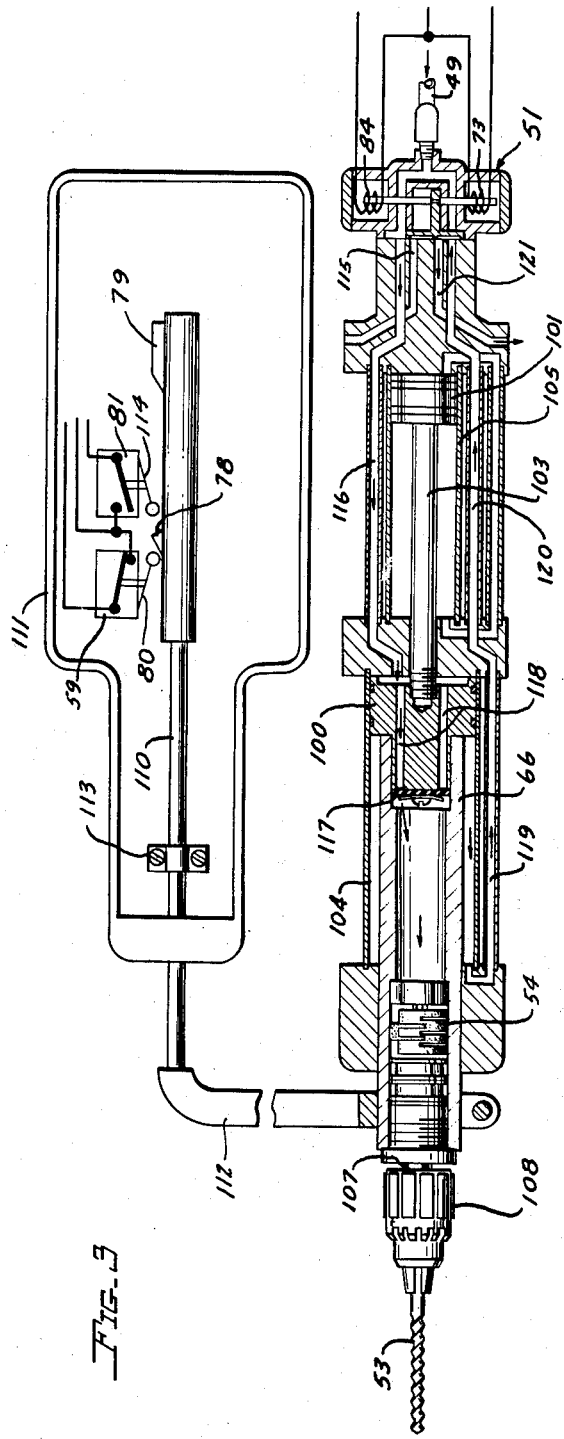
Fig. 3 is a vertical sectional view, partially schematic, through the tool actuating mechanism of the machine.

The cooperating work performing components and the control system therefor embodied in this invention may be used in connection with various kinds of machine tools, and for the purpose of illustration are shown as used in connection with a hole drilling machine.

General description

Generally, the invention includes a work supporting table 33 having a fixed row of guide pins 35 on its upper surface to determine the path of travel of the work across the table. The formed part or work piece 31 is mounted on and supported by a mandrel or template 32, the lower surface of which is grooved longitudinally as at 34 to receive the guide pins 35 and thus guide the work piece as the mandrel slides along the table surface. A series of fixed index pins 36 and 89 project outward from a surface of the mandrel, and their accurate locations thereon determine the successive points at which work is performed on the work piece. A work performing tool 53 is mounted to be rotated and moved reciprocably by a fluid pressure unit 52 between work engaging and retracted positions. A fluid pressure actuated clamp 48 is mounted adjacent the tool 53 to hold the work firmly during each work performing operation. Solenoid operated valves control the fluid pressure flow to the tool moving cylinder and piston 52, and to the work clamp actuating cylinder and piston 47.

Two closely spaced vertically reciprocable pins 37 and 67 (Fig. 2) project upward through the table top, and are located directly in the path of travel of the series of index pins 36 and 89 on the work supporting mandrel 31. The first of these pins 37 in the path of travel is spring pressed upward, has a cam shaped upper end, and is depressible downward as each index pin cams over it during progress of the mandrel and work piece along the table. It will be referred to as a system conditioning or starter pin. The second pin 67 is movable by a fluid pressure actuated cylinder and piston 65 between an up position in which it blocks the path of travel of each index pin successively, and a down or retracted position below the table surface, as shown in Fig. 2. Solenoid operated valves 63 and 64 (Fig. 4) control fluid pressure flow to this stop pin actuating cylinder and piston.

The various solenoid valves are controlled by an electrical system which includes switches, relays, etc., the switches being mechanically actuated by certain of the mentioned mechanisms during their movement, as will be explained in detail.

General operation

As the mandrel 32 and its fitted workpiece 31 are moved along their guided path of travel by the operator (or by mechanical feed means, not shown) the first index pin 36 on the mandrel cams over and momentarily depresses starter pin 37. Stop pin 67 instantly moves upward and is next contacted by index pin 36. This contact stops workpiece and mandrel travel, and as will be explained in detail, initiates clamping action by clamp 48, and tool actuation by unit 52.

Clamp 48 holds workpiece and mandrel while the tool 53 drills a hole in the workpiece. A limit switch actuated by forward travel of the tool reverses tool movement to a retracted position, retracts clamp 48, and retracts stop pin 67, allowing travel of the work piece and mandrel to resume until the next index pin in the series depresses starter pin 37, repeating the cycle.

Tool actuating mechanism

The drill reciprocating and rotating mechanism, though illustrated as a component of this invention, is available as a complete unit on the open market, and was neither originally conceived nor designed by applicant. Other similarly controlled tool handling units may be substituted, depending on whether a drilling, punching, or rivet setting operation is desired.

Since the unit illustrated is available on the open market, it is not believed necessary to completely illustrate and describe its details of construction. As diagrammatically shown in Fig. 3, this unit includes two tandem plungers 100 and 101 mounted respectively on rigidly connected rods 66 and 103, in separate cylinders 104 and 105. Hollow rod 66 projects from the end of cylinder 104. This rod serves as a housing for an air driven motor 54 which drives spindle 107. A tool chuck 108 is carried on the outer end of spindle 107. A solenoid actuated four-way directional slide valve 51 controls both the operation of air motor 54 and the reciprocation of the tool carrying rod 66.

A follower rod 110 is reciprocable in a separate housing 111 secured atop the unit 52, as in Fig. 1. A rigid bracket 112 has one end secured to the outer end of hollow rod 66, and its other end to rod 110. The two rods are thus constrained to travel together. The travel of rod 110 is guided by suitable guides 113.

Rod 110 carries a depressible outwardly spring pressed dog 78, and a lengthwise adjustable cam 79. Inside the housing 111 and adjacent the dog 78 are mounted a normally closed switch 59 having an outwardly spring pressed arm 80, and a normally open switch 81 having an outwardly spring pressed arm 114. Solenoids 73 and 84 for actuating valve 51 are provided.

Air under pressure flows from supply pipe 49 through valve 51 and duct 116 into the rear of cylinder 104, forcing piston 100 forward and advancing the rod 66 and the drill spindle.

During this movement air flows through ports 118 past flapper valve 117, and through the bore of rod 66 to air motor 54. Air in front of plunger 100 is exhausted through ducts 119 and 120, and through valve exhaust port 121.

When the spindle is fully advanced and the drill has performed its work cam 79 actuates switch 81 de-energizing coil 73 and energizing coil 84 which operates valve 51. Air line pressure then flows through ducts 120 and 119 into the front end of cylinder 104, and forces plunger 100 in the opposite direction, to retract the drill spindle. Air is exhausted through duct 116 and exhaust port 115.

Cylinder 105 is filled with hydraulic fluid, and through a selectively variable by-pass serves to control the speed at which the tool is fed into the work. The means for coordinating the action of this tool actuating mechanism with the other components is explained elsewhere in this document.

Start and stop pin mechanism

Referring to Fig. 2, it will be seen that starter pin 37 is vertically reciprocable in a body 122 fixed to the under side of table 33. A lever arm 123, centrally pivoted to the body at 124, has one end bearing upward against the lower end of pin 37, while its opposite end is spring pressed downward by spring 125. A switch 56 is held normally open by the spring pressed end of this lever, but is allowed to close when pin 37 is depressed and the spring pressed end of the lever consequently raised.

Stop pin 67 is reciprocable vertically in a body 126 which is also mounted on the under side of table 33 for very limited slidable movement in a plane parallel to the table and along the guided path of travel of the mandrel and workpiece. A spring pressed pin 127 contacts a portion of this body 126 and urges it toward starter pin 37.

The body 126 includes a pressure cylinder 65 housing a plunger 128 which is rigidly secured to and reciprocates pin 67. Flexible fluid pressure supply and exhaust lines 129 and 130 are connected to opposite ends of the cylinder. It will be seen that the cylinder and plunger are so designed as to afford an air cushion chamber at each end of the cylinder to absorb shock as the plunger is moved at high speed in either direction.

Switches 43 and 69, supported on a table bracket 131, are mounted with their respective plungers 132 and 133 in alignment with adjustable length buttons 134 and 135 fixed on the body 126. Thus when the entire body 126 and its stop pin 67 are moved to the right in Fig. 2 due to contact of an index pin on the mandrel with the stop pin, both switch arms are also forcibly pivoted to the right to create new circuits, as will be further explained. When body 126 is returned to its normal position by pin 127, both switch arms are also allowed to return to their normal positions by spring pressure.

Again referring to Fig. 1, it will be seen that the clamp actuating cylinder 47 is slidably mounted on a table supported standard 136, and is vertically adjustable with relation thereto by means of a manually operable jack screw 137. Also that the tool actuating unit 52 is horizontally movable toward and away from the work station by means of a jack screw 138. In addition, the support 139 which supports unit 52, is itself vertically adjustable with relation to the machine frame 140 by means of a third jack screw 141.

Machine operation and control system

In Fig. 4 a master double pole electrical switch 30 is open, and all parts of the machine are in their normal at rest positions.

Work piece 31 is mounted on indexing mandrel 32, and the mandrel is placed on the table 33 with its longitudinal groove 34 straddling the row of guide pins 35, fixed in the table top.

Power switch 30 is closed (Fig. 5), and the work is advanced in the direction of the arrow. The first indexing pin 36 contacts cam type starter pin 37 and depresses it momentarily as the work and mandrel pass on.

When switch 30 is closed solenoid 38 is energized and opens normally closed master valve 39, releasing air under pressure into the system from a supply line 40. The closing of switch 30 causes current to flow through a transformer 41, through a conductor 42, through a two way control switch 43 and conductor 44 to energize a solenoid 45, which actuates a valve 46, allowing pressure air to flow through line 49 to the lower chamber of a double acting cylinder 47 to maintain work clamping pad 48, attached to the plunger of the piston, in raised position.

The opening of master valve 39 also permits pressure air to flow through line 49, solenoid valve 51, and line 116 to the forward end of tool reciprocating cylinder 52 to temporarily hold the tool 53 in a retracted position. In the embodiment illustrated the tool 53 is a drill driven by an air motor 54, as previously explained, and pressure air conducted through line 116 also begins rotating the drill at drilling speed.

The over-riding of pre-charging pin 37 by indexing pin 36, and the consequent depression of pin 37 closes normally open switch 56 momentarily. The circuit thus temporarily closed energizes holding relay 57, which closes switch 61, forming an additional circuit (Fig. 5)

from master switch 30 through conductor 58, normally closed switch 59, conductor 60, switch 61, back through relay 57 to hold the switch 61 closed after switch 56 re-opens, and through conductor 62. This closed circuit also energizes the coils in stop pin controlling solenoid valves 63 and 64. Valve 64 is thereby moved to connect the lower end of cylinder 65 with air supply line 49 (Fig. 5), and valve 63 is moved to an exhaust position to exhaust air from the upper end of cylinder 65. Stop pin 67 is thus moved upward by the plunger 128 in this cylinder, and into the path of travel of indexing pin 36, as the work piece 31 continues its forward movement.

As the work piece 31 moves forward, index pin 36 contacts the upper end of stop pin 67 and pushes that pin and its supporting body 126 forward slightly until the pin 67 blocks further forward movement of the mandrel. As the pin 67 is moved forward the body 126 actuates switches 43 and 69, moving the respective switch arms into contact with contacts 70 and 88, respectively.

Figure 6:
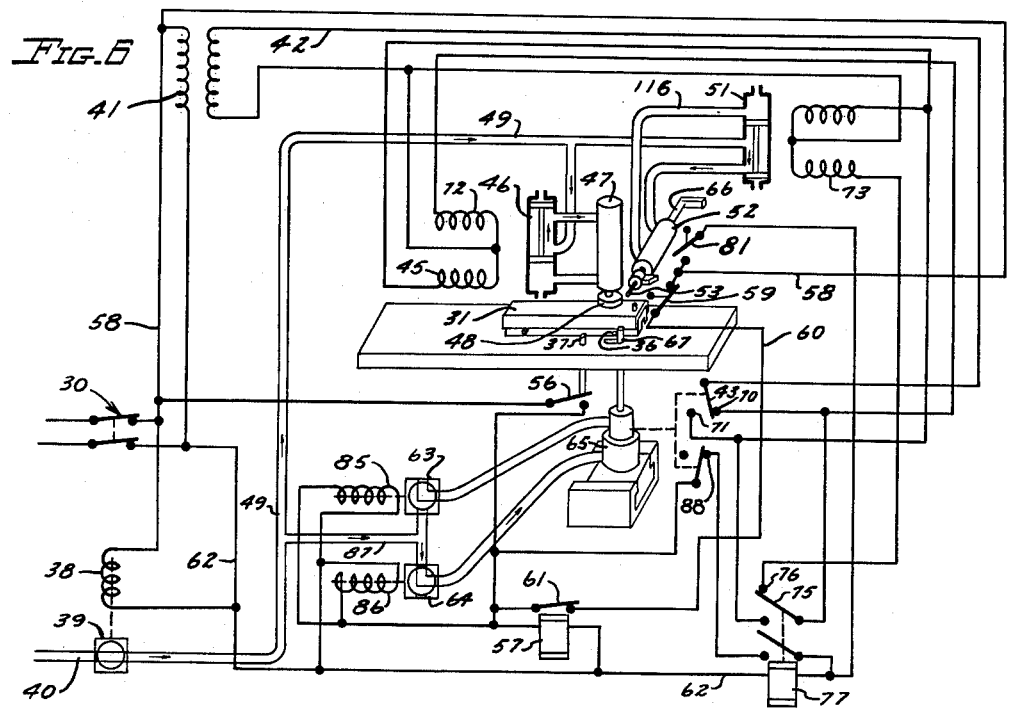

When the transformer circuit through switch contact 71 (Fig. 6) is broken, coil 45 in valve 46 is de-energized and coil 72 is energized, moving the valve to an up position to supply air to the upper end of the cylinder 47 and to exhaust air from its lower end. Plunger attached clamp pad 48 is thus moved downward into work contact. The transformer circuit through contact 70 also energizes coil 73 of solenoid valve 51, through contacts 75 and 76 of de-energized relay 77. The valve 51 is thereby moved to supply air to the aft end of tool moving cylinder 52, and to exhaust air from its forward end, the air pressure thus moving the tool 53 into work contacting position, as shown in Fig. 7.

Figure 7:
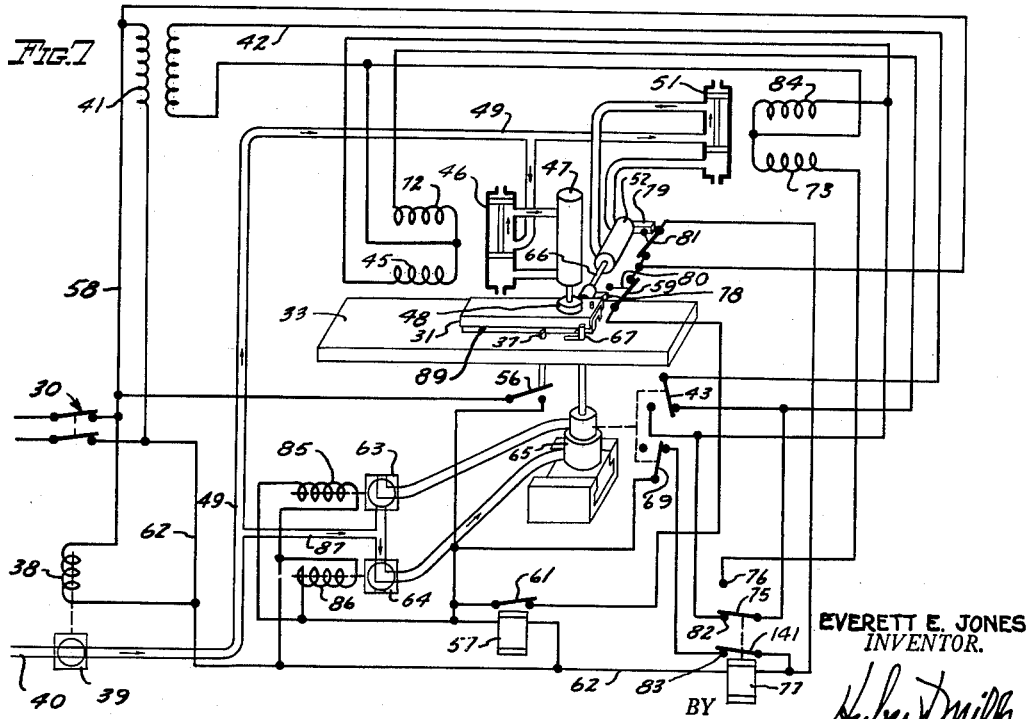

Referring to Fig. 7, the plunger 66 in cylinder 52 carries a depressible dog 78 which is spring pressed outward, and this plunger also carries an adjustable cam 79, which may be selectively positioned to stop the forward travel of the plunger at a desired point, as has been described. As the plunger moves forward, switch arm 80 (Fig. 3) of switch 59 depresses dog 78, and the switch remains closed. As movement continues cam 79 contacts switch blade 114 and closes this normally open limit switch 81. Cam 79 is adjustably positioned on the plunger 66 so that switch 81 will be closed just after the plunger has traveled sufficiently forward for the tool 53 to have completed its work.

The momentary closing of switch 81 accomplishes several things. It makes a circuit from the master switch 30 through holding relay 77. This relay moves the relay switch blades 75 and 141 into contact with contacts 82 and 83 respectively, and breaks the circuit through the relay switch contact 76. The circuit made through contact 83 and through switch 69 also passes through the relay coil 77 to maintain these two new circuits after switch 81 re-opens.

When the circuit through contact 76 is broken, coil 73 of valve 51 is de-energized. Simultaneously the transformer circuit through contact 82 energizes coil 84, moving the valve 51 to a position to exhaust air from the rear end of cylinder 52 and to supply air to the forward end, thus moving plunger rod 66 and the rod carried tool 53 away from the work piece, and allowing switch 81 to spring return to its normally open position.

Referring to Fig. 8, during rearward movement of plunger rod 66, dog 78 on rod 110 (Fig. 3) contacts switch arm 80 of the normally closed switch 59 and momentarily opens this switch, momentarily breaking the circuit from master switch 30 through the coil of relay 57. The de-energization of this coil permits normally open switch 61 to re-open, as in Fig. 8. The opening of switch 61 breaks the circuit through switch 59. This switch is spring returned to its normally closed position after being tripped open by the dog 78.

The breaking of the circuit through switch 61 de-energizes coils 85 and 86 of valves 63 and 64 respectively, and these valves are spring returned to their respective normal positions, with valve 63 connecting air supply pipe 87 with the upper end of cylinder 65, and valve 64 exhausting air to the atmosphere from the lower end of this cylinder. Stop pin 67 is consequently moved downward so that the forward movement of index pin 36 and the work piece is no longer blocked. As soon as stop pin 67 breaks contact with the index pin 36, the spring pressed plunger 127 (Fig. 2) returns the body 126 and the stop pin 67 to their respective normal positions, as shown in Fig. 2. The switch arms of switches 43 and 69 are simultaneously spring returned to their respective normal positions.

When the circuit through switch contact 70 is broken, coil 72 of solenoid valve 46 is de-energized. When the circuit from the transformer through contact 71 of switch 43 is re-established, coil 45 of solenoid valve 46 is energized, moving the valve plunger downward. Pressure air is thus fed from line 49 to the lower end of work clamping cylinder 47 and exhausted from its upper raising clamp pad 48 and releasing the work to move forward until the next index pin 89 rides over pre-charging pin 37, and the cyle is repeated.

Having described the construction and operation of the illustrated form of the invention with sufficient clarity to enable those familiar with this art to construct and use the invention, I claim:

1. In a machine tool: traveling means for supporting and guiding a workpiece along a predetermined path adjacent a work performing station, said means having a row of spaced index pins fixed on and carried thereby; a power operated work holding clamp adjacent said station; a power operated work performing tool at said station; a depressible starter cam in the path travelled by said index pins and depressible thereby consecutively; a power operated normally retracted stop pin adjacent and down-path from said cam, and movable between index pin blocking and retracted positions; means actuated by depression of the starter cam by an index pin to move the stop pin into blocking position; means actuated by the impact of an index pin against the stop pin to move the clamp to clamp the workpiece, and to subsequently move the tool into work performing contact; means actuated by such movement of the tool in a work performing direction to reverse tool movement and to retract the tool; and means actuated by the tool during its retractive movement to retract the clamp and the stop pin to afford additional movement of the work and its supporting and guiding means down the guided path of travel until the next adjacent index pin contacts and depresses the starter cam.

2. A machine tool comprising: a table; workpiece supporting means including fixed spaced index pins for determining locations at which work is to be performed on the workpiece; means for guiding the workpiece supporting means in a predetermined path along the table; a power operated work holding clamp adjacent said path and movable between work clamping and retracted positions; a power operated work performing tool movable between work performing and retracted positions; an upwardly spring pressed starter cam in the path of travel of the index pins on the work supporting means, and depressible successively by said index pins as the work supporting means progresses down its guided path; a power operated normally retracted stop pin in the path of travel of said index pins adjacent and down-path from said cam, movable between index pin blocking and retracted positions, and also having limited movement along said path of travel; means actuated by the momentary depression of said cam by an index pin for moving the stop pin into an index pin contacting position; means actuated by limited movement of the stop pin down-path by an indexing pin to actuate the clamp to clamp the workpiece, and to move the tool into work performing contact with the workpiece after the work has been clamped; means actuated by the tool during its movement in a work performing direction to reverse the direction of movement of the tool and to retract it; and means actuated by the tool during its movement toward a retracted position to retract both the work holding clamp and the stop pin, to thus permit the work supporting means and the work piece to progress down-path until the starter cam is depressed by the next adjacent index pin.

3. A machine tool comprising: a table; means for supporting and guiding a workpiece along said table in a predetermined path, said means carrying fixed indexing pins for determining various stations at which work operations are to be performed on the workpiece; a driven work operation performing tool movable between work performing and retracted positions; means for moving the tool between said positions; a work holding clamp; means for moving the clamp between work holding and retracted positions; an upwardly spring pressed reciprocably mounted system starter cam projecting upright through said table in the path of travel of said indexing pins, and adapted to be depressed successively by said indexing pins as the work progresses along its guided path of travel; an upright reciprocably mounted stop pin movable between index pin blocking position and retracted position, and also movable a limited distance along the path of travel of said indexing pins while in an index pin blocking position; means for moving the stop pin between index pin blocking and retracted positions; means actuated by the overriding of said cam by an indexing pin to move the stop pin upward into the path of travel of the said indexing pin; means actuated by movement of the stop pin along its path of travel by an indexing pin to actuate the clamp moving means to clamp the workpiece, and to actuate the tool moving means to move the tool into work performing contact with the workpiece; means actuated by the tool during its movement in a work performing direction to actuate the tool moving means to retract the tool; means actuated by the tool during its movement toward a retracted position to actuate the clamp moving means to retract the clamp, and to actuate the stop pin moving means to retract the stop pin.

4. A machine tool comprising: a work supporting table having a work station thereon; a work holding clamp near said station; power operated clamp moving means; a work performing tool at said station; power operated tool moving means; a work piece carrier including spaced index pins projecting therefrom; means for guiding the carrier along the table past said station; a normally retracted stop pin near said station for periodically interrupting the progress of said carrier by blocking contact with said index pins successively; power operated stop pin moving means; a starter cam on said table in advance of said stop pin, and successively operable by said index pins as the carrier progresses down its guided path; a cam operated switch for energizing said stop pin moving means to move the stop pin into an index pin blocking position; a stop pin actuated switch for energizing the clamp moving means to move the clamp into work clamping position, and for energising the tool moving means to move the tool to perform its work; a tool actuated switch for energizing the tool moving means to move the tool in the opposite direction; and a second tool actuated switch for energizing both the clamp moving means and the stop pin moving means to unclamp the work and to retract the stop pin.

5. A machine tool comprising: a table having a work station thereon; a work piece carrier including spaced index pins projecting therefrom; means for guiding the carrier along the table past said station; a power operated work contacting clamp near said station; a power operated work performing tool at said station; a power operated stop pin on the table for successively contacting said index pins and interrupting the advance of the workpiece carrier; movable means mounted on said table and responsive to movement by successive ones of said index pins to initiate successive cycles of operation of the machine, and means responsive to such initiation of a cycle to successively move the stop pin to block carrier travel, to clamp the workpiece and its carrier against movement, to actuate the tool to perform its work on the workpiece, to retract the tool, to retract the clamp, and to retract the stop pin to condition the entire machine for the next cycle initiation.

6. A machine tool including: a work station alongside which a workpiece is adapted to pass; a tool at the station movable between retracted and work operation performing positions; a work piece carrier having a row of index pins fixed thereon; a starter cam at the work station depressible sequentially by said index pins; a stop pin at the work station to sequentially block index pins and arrest workpiece movement; means for forcibly moving the stop pin into and away from an index pin blocking position; means actuated by the depression of said starter cam to actuate the stop pin moving means to move the stop pin into index pin blocking position; and means actuated by the tool during retraction from a work operation to actuate the stop pin moving means to retract the stop pin from index pin blocking position to free the carrier and workpiece.

7. A machine tool for successively and progressively performing a pre-determined type of work operation at equally or variably spaced but accurately located desired points along a workpiece comprising: means for supporting and guiding a workpiece past a work station, said means having a series of index pins fixed thereon; movable means to successively contact said index pins to periodically stop the travel of the workpiece and its supporting and guiding means; clamping means to hold the workpiece while work is being performed thereon; a work performing tool; tool moving means to positively move the tool into and away from work performing contact with the workpiece; means movable successively by said index pins to actuate the workpiece travel stopping means to stop the workpiece; means movable by the workpiece travel stopping means to actuate the clamping means to clamp the workpiece after its travel has been stopped, and to subsequently actuate the tool moving means to move the tool into work performing contact with the workpiece; means movable by the tool moving means as the tool completes its work to actuate the tool moving means to retract the tool; and means movable by the tool moving means as it retracts the tool to actuate the workpiece travel stopping means to free the workpiece and its supporting and guiding means, and to actuate the clamping means to free the workpiece for additional travel.

References Cited in the file of this patent

UNITED STATES PATENTS

| | | |
|---|---|---|
| 2,300,253 | Hamilton et al. | Oct. 27, 1942 |
| 2,462,327 | Mills | Feb. 12, 1949 |